Dec. 18, 1923.
E. R. DRAVER
FEEDER
Filed July 1, 1921
1,478,000
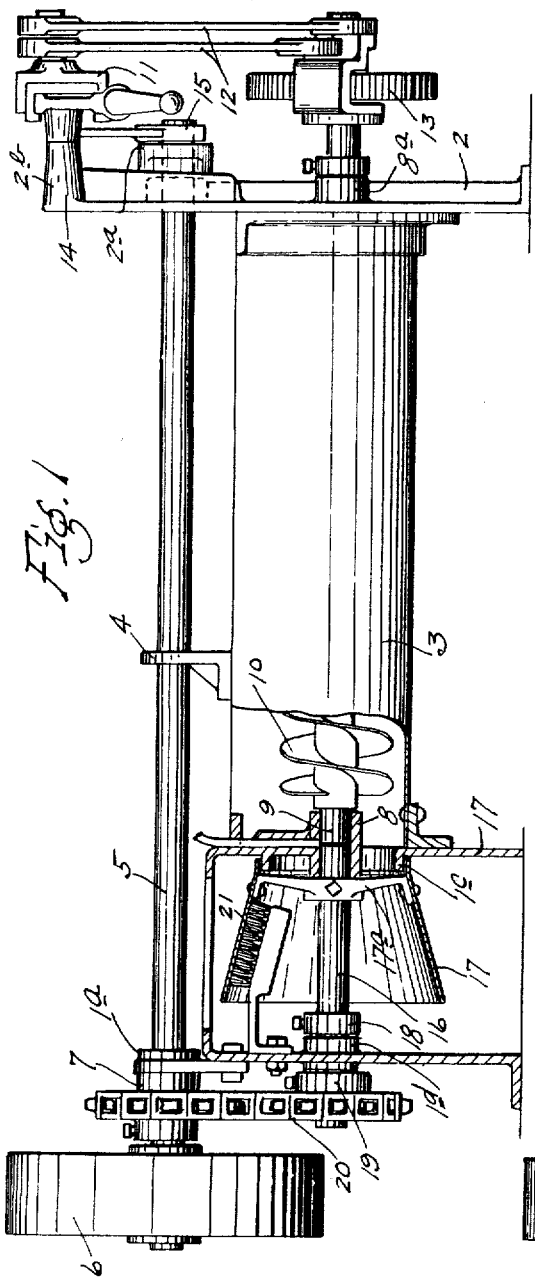
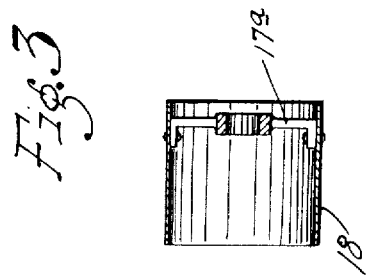
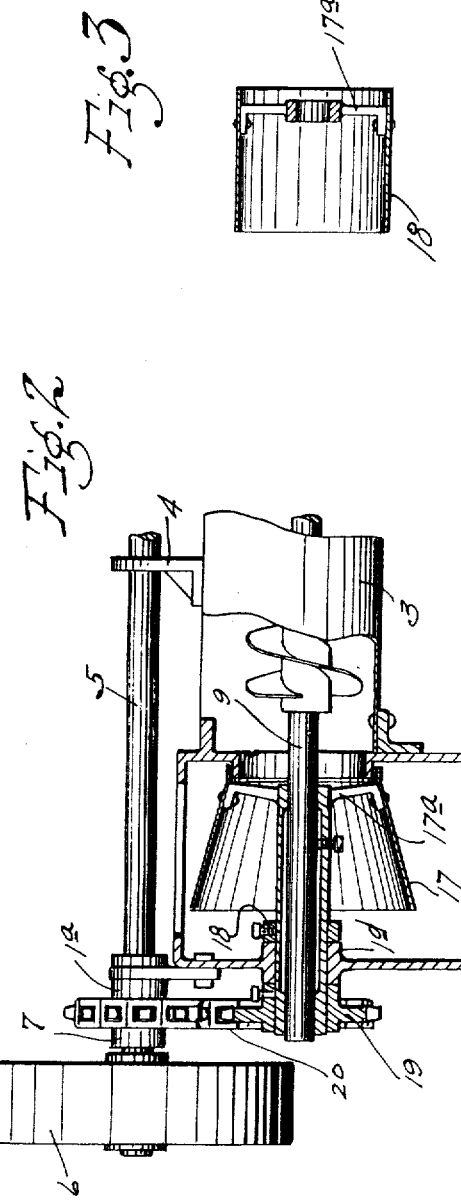
INVENTOR
Emil R. Draver
BY HIS ATTORNEY
James F. Williamson Patented Dec. 18, 1923.

1,478,000

UNITED STATES PATENT OFFICE.

EMIL R. DRAVER, OF RICHMOND, INDIANA, ASSIGNOR TO B. F. GUMP COMPANY, OF CHICAGO, ILLINOIS, A CORPORATION OF ILLINOIS.

FEEDER.

Application filed July 1, 1921. Serial No. 481,791.

*To all whom it may concern:*

Be it known that I, EMIL R. DRAVER, a citizen of the United States, residing at Richmond, in the county of Wayne and State of Indiana, have invented certain new and useful Improvements in Feeders; and I do hereby declare the following to be a full, clear, and exact description of the invention, such as will enable others skilled in the art to which it appertains to make and use the same.

This invention relates to a feeding device and particularly to a feeding device used in mills or other places for the purpose of uniformly feeding ground or granular material. Devices of this type are also widely used for feeding and blending different kinds of flour, cereals and various ground material used in the production of stock foods.

It is an object of this invention to combine with the discharge outlet of a housing having a mixing or conveying device therein, a feeder by which the material discharged from the hopper will be fed in an even and uniform stream.

It is a further object of the invention to provide such a feeder which may be conveniently driven from the same drive shaft that drives the said conveying or mixing device.

Still a further object of the invention is to provide such a feeding device in the form of a hollow cone and also to provide a convenient means for mounting the same.

These and other objects of the invention will be clearly brought out in the following description made in connection with the accompanying drawings in which like reference characters refer to the same parts throughout the different views and, in which, Fig. 1 is a view in side elevation of the mixing and feeding device, a portion thereof being shown in section;

Fig. 2 is a partial view of the similar nature showing a modification; and

Fig. 3 is a sectional view of a modified form of a feeding device.

Referring to the drawings:

The device comprises spaced frame members 1 and 2 between which is mounted in suitable supports a trough shaped housing 3. The frame members are also provided above said housing with alined bearings 1ª and 2ª, in which is rotatably mounted a drive shaft 5, which shaft is also supported by an auxiliary bearing 4 mounted on the top of the housing 3. The shaft 5 is provided at one end with the driving pulley 6 fixed thereto and between said pulley and the bearing 1ª a sprocket wheel 7 is secured to said shaft by a set screw or other suitable means. The pulley 6 may be provided with some suitable form of clutch mechanism by which the same can be readily connected or disconnected from a shaft 5. The frame members 1 and 2 also support bearings 8 and 8ª, in which is journaled for rotation a shaft 9 passing centrally through the trough 3 and having secured thereto a conveying and mixing element 10 shown as comprising a helical conveyor. The frame 2 above the bearing 2ª is also provided with a bearing 2ᵇ in which is mounted on a suitable short shaft a rocking member 11. This rocking member is connected by a pair of links 12 to pawl and ratchet mechanism generally designated as 13, the ratchet wheel of which is secured to the end of the shaft 9. The mechanism comprising the members 11 to 13 in itself forms no part of the present invention, but may be of the type shown in my prior Patent No. 1,307,349 dated June 24th, 1919. The rocking member 11 is driven by a disconnectible link 14 connected to a crank pin 15 extending from a crank arm secured to crank shaft 5. The frame member 1 comprises the portion 1ᵇ forming a support and closure member for one end of the housing 3 and is also formed with a cylindrical projecting flange or lip 1ᶜ and an opening forming the outlet from said housing. The frame 1 is further equipped with a bearing 1ᵈ in alinement with the bearing 8 in which bearings are journaled a shaft 16. A hollow frusto-conical member 17 is supported upon a suitable spider 17ª, which is secured to shaft 16 adjacent the bearing 8, the end of member 17 being formed cylindrical and surrounding the flange 1ᶜ. A collar 18 is secured to the shaft 16 adjacent the bearing 1ᵈ and prevents longitudinal motion of said shaft. At the outer end of shaft 16 adjacent the outer end of bearing 1ᵈ is secured a sprocket wheel 19 of substantially the same diameter of and arranged in alinement with sprocket wheel 7 from which it is driven by a connecting chain 20.

A brush member 21 is arranged to bear against the upper side of the member 17 and is provided with an angular bracket arranged to be bolted to frame member 1.

The operation of the device is as follows: The power being applied to the pulley 6 by a suitable belt, the shaft 5 is rotated and rotates the crank arm 15. Rocking movement is transmitted from the crank arm to the rocking member 11 and the ratchet wheel of the pawl and ratchet mechanism is thus intermittently turned through the links 12. An intermittent rotation is thus given to the mixing and conveying element 10. It may be stated that the rocking movement transmitted to the pawl and ratchet mechanism is variable by means of the adjustment of the rocking member 11 by the crank shown so that member 10 can be driven at various speeds. The feeding element 17 will be driven through sprockets 7 and 19 and the chain 20 and will be constantly driven. As the shaft 16 is constantly driven from the shaft 5 at substantially the same speed as the latter, and the conveyor 10 is only intermittently driven, a part of a revolution for every revolution of shaft 5, it is apparent that the conveyor is rotated at a less speed than the shaft 16 which carries the distributing member 17. The material will be discharged and fed through the opening at the bottom and end of trough 3 onto the member 17 and will be fed thereby in an even and uniform stream. When the brush 21 is supplied any material adhering to the said member, will be removed therefrom as the same rotates.

In the modification shown in Fig. 2, the bearing 1ᵈ is provided with a larger bore and the spider 17ᵃ is provided with a hub formed as an elongated sleeve or hollow shaft extending through the bearing 1ᵈ. This sleeve carries the sprocket 19 and the collar 18, and the shaft 9 of the conveyor extends through the sleeve and is supported thereby at its outer end.

The operation of this form of the invention will be substantially like that described. The member 17 will be constantly driven by the sprocket 19 and will rotate on the shaft 9 as a bearing, being also supported in bearing 1ᵈ.

From the above description, it is seen that applicant has provided a convenient and efficient feeding device and one which is arranged to be readily and conveniently driven from the drive shaft of the conveyor and mixing element. It will be noted that by the construction described, the feeding member 17 can be driven in either direction and yet the conveyor will be driven in the proper direction to discharge the material through the intermittent feeding mechanism at one end of the device. In Fig. 3, the feeding device 18 will be mounted in the same manner as the element 17 but is shown in the form of a cylindrical tube instead of conical form.

It will, of course, be understood that various changes may be made in the form, details and arrangement of the device without departing from the scope of applicant's invention, which generally stated consists in the matter shown and described and set forth in the appended claims.

What is claimed is:—

1. A feeding and distributing device for fine or granular material comprising a stationary trough having a discharge outlet at one end, a conveyor in said trough, a hollow conical chute having a free outer edge and having its smaller end disposed adjacent to and continuous with said trough and outlet, means for constantly rotating said chute, and means for rotating said conveyor.

2. A device of the class described having in combination, a housing, a mixing and feeding element therein, means for rotating said element, said housing having an outlet, an open-ended frusto-conical feeding device having a free outer edge and having its smaller end alined with said housing and receiving from said outlet, means for constantly rotating said feeding device, and a common drive shaft for operating said last named means and the means for rotating said mixing and conveying element.

3. A feeding mechanism comprising a supply conveyor, a hollow conical feeding element in alinement therewith and receiving directly therefrom, driving means for the said feeding element and means for driving said conveyor at a less speed than said feeding element.

4. A feeding mechanism comprising an intermittently driven rotary conveyor, a hollow continuously rotated flaring feeding drum in alinement therewith and to which said conveyor directly delivers, said feeding drum being of greater radial extent than said conveyor, and means for driving said conveyor at a less speed than said feed drum.

5. A feeding device having in combination, a horizontal trough, a driven conveyor therein, a constantly rotating hollow imperforate frusto-conical distributing member axially alined with said trough and having its inner and smaller edge substantially alined with the bottom of said trough and receiving material therefrom and having its larger end free whereby the material discharged from said trough travels the entire length of said member.

6. The structure set forth in claim 8 and a common driving shaft from which said conveyor and feeding device are driven.

7. A feeding mechanism having in combination a housing, a mixing and intermittently driven feeding and conveying element therein, a hollow conical constantly driven feeding element to which said conveying element delivers, separate shafts upon which said elements are mounted, a common driving shaft and means for driving said elements from said driving shaft.

8. A feeding mechanism having in combination, an intermittently driven feeding and mixing conveyor, a constantly driven imperforate frusto-conical feeding element to which said conveyor delivers, a common driving shaft having its axis parallel to the axis of said conveyor and feeding element, adjustable means for intermittently driving said conveyor from said driving shaft, and means for driving said feeding element from said driving shaft.

9. A feeding device having in combination a stationary trough having a discharge opening at one end thereof, a mixing and conveying means therefor, a hollow frusto-conical imperforate drum rotatably mounted with its smaller end adjacent the discharge opening of said trough, said drum having an uninterrupted interior surface from a point adjacent the trough to its discharge end, and means for continuously rotating said drum.

10. A feeding device consisting of a frame, a trough supported therein, a shaft with a conveyor in said trough, a conical drum feeder having a shaft in line with said conveyor shaft, and at the discharge end of said conveyor, a common drive shaft, and separate mechanism connected with said drive shaft and said conveyor and feeder shafts, respectively, for operating the conveyor and feeder at different speeds.

In testimony whereof I affix my signature in presence of two witnesses.

EMIL R. DRAVER.

Witnesses:
ORRIN DRAVER,
ESTHER MORGAN.